(12) United States Patent
Steiner et al.

(10) Patent No.: US 9,640,211 B1
(45) Date of Patent: May 2, 2017

(54) SERVO TRACK ENCODING AND DECODING

(71) Applicant: Seagate Technology LLC, Cupertino, CA (US)

(72) Inventors: Philip L. Steiner, Los Altos, CA (US); Bruce Douglas Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/151,237

(22) Filed: May 10, 2016

(51) Int. Cl.
*G11B 5/09* (2006.01)
*G11B 5/02* (2006.01)
*G11B 5/596* (2006.01)

(52) U.S. Cl.
CPC ...... *G11B 5/59688* (2013.01); *G11B 5/59633* (2013.01)

(58) Field of Classification Search
CPC ............ G11B 27/3027; G11B 2220/20; G11B 2220/90; G11B 5/59688; G11B 5/59655; G11B 5/5534; G11B 5/5547; G11B 5/59633
USPC ............ 360/49, 48, 77.08, 77.05, 78.14, 55
See application file for complete search history.

(56) References Cited

U.S. PATENT DOCUMENTS 7,116,505 B1 * 10/2006 Kupferman ........ G11B 7/00745
360/48
8,922,921 B1 * 12/2014 Hebbar ............ G11B 5/59627
360/17

* cited by examiner

*Primary Examiner* — Nabil Hindi

(57) ABSTRACT

A system includes a memory, a processor, an encoder, a head, and a decoder. The memory stores information. The processor processes information and controls operation of other components. The encoder encodes a first portion and a second portion of a servo track to form a first and second encoded values. The second code has a run length associated therewith. The first and second encoded values result in a Gray code. Each bit of the Gray code remains constant for at least a number of tracks corresponding to the run length. The head is configured to write the first and the second encoded values onto a media, and is configured to read the first and the second encoded values from the media. The decoder decodes the first encoded value and the second encoded value. The processor determines a servo track address from the decoded first value and the decoded second value.

21 Claims, 15 Drawing Sheets

| Track address and constituent fields | | | RLL Gray code | Gray used value | bin MSBs |
|---|---|---|---|---|---|
| Full | MSB's | LSB's | | | |
| 31 | 0 | 31 | g[31] | 8 | 0000 |
| 32 | 1 | 0 | g[31] | 8 | 0001 |
| 33 | 1 | 1 | g[0] | 0 | 0001 |
| 34 | 1 | 2 | g[1] | 1 | 0001 |
| 35 | 1 | 3 | g[2] | 3 | 0001 |
| .. | .. | .. | .. | .. | .. |
| 62 | 1 | 30 | g[29] | 26 | 0001 |
| 63 | 1 | 31 | g[30] | 24 | 0010 |
| 64 | 2 | 0 | g[30] | 24 | 0010 |
| 65 | 2 | 1 | g[31] | 8 | 0010 |
| 66 | 2 | 2 | g[0] | 0 | 0010 |
| 67 | 2 | 3 | g[1] | 1 | 0010 |
| 68 | 2 | 4 | g[2] | 3 | 0010 |
| .. | .. | .. | .. | .. | .. |
| 94 | 2 | 30 | g[28] | 27 | 0011 |
| 95 | 2 | 31 | g[29] | 26 | 0011 |
| 96 | 3 | 0 | g[29] | 26 | 0011 |
| 97 | 3 | 1 | g[30] | 24 | 0011 |
| 98 | 3 | 2 | g[31] | 8 | 0011 |

↑ First Transition Point
↑ Second Transition Point

FIGURE 1C

| RLL Gray LUT | |
|---|---|
| 0 | 0 |
| 1 | 1 |
| 2 | 7 |
| 3 | 2 |
| 4 | 13 |
| 5 | 12 |
| 6 | 14 |
| 7 | 3 |
| 8 | 31 |
| 9 | 26 |
| 10 | 6 |
| 11 | 27 |
| 12 | 24 |
| 13 | 25 |
| 14 | 5 |
| 15 | 4 |
| 16 | 21 |
| 17 | 20 |
| 18 | 8 |
| 19 | 9 |
| 20 | 22 |
| 21 | 11 |
| 22 | 15 |
| 23 | 10 |
| 24 | 30 |
| 25 | 19 |
| 26 | 29 |
| 27 | 28 |
| 28 | 23 |
| 29 | 18 |
| 30 | 16 |
| 31 | 17 |

SERVO TRACK ENCODING AND DECODING

BACKGROUND

In general, Gray codes have been used to encode the servo field of media. Conventionally the encoding scheme converts the sequential track number into a Gray code, e.g., by only changing one bit from one track to the next, where the lowest order bit changes on every other track. In other words, the lowest order bit changes much more frequently than other bits. Writing technologies for patterned media such as e-Beam Writer (EBW) usually have minimum feature size constraints, and it becomes more challenging to use a technology such as EBW as the required feature sizes become smaller. Using Gray codes for the servo field of the media is especially challenging because of the frequency by which the lowest order bit changes value, e.g., every other track.

SUMMARY

Accordingly, a need has arisen to encode the servo field track of a media using Gray codes while distributing the change in bit values more evenly among all order bits in order to enable writing technologies such as EBW without violating the minimum feature size constraint especially as feature sizes become smaller. Provided herein is an encoding scheme to encode a first portion of the servo field associated with a track using one encoding scheme and encoding the second portion of the servo field associated with the same track using another encoding scheme to generate a Gray code servo field in such way to distribute the change of bit value more evenly among all order bits of the servo field.

According to some embodiments a method includes encoding a first portion of a servo track with a first code and encoding a second portion of the servo track with a second code. The first portion comprises a first plurality of bits that corresponds to the most significant bits of the servo track. The second portion comprises a second plurality of bits that corresponds to the least significant bits of the servo track. The first portion is exclusive of the second portion. It is appreciated that the second code has a run length associated therewith and that each bit of the second plurality of bits remains constant for at least a number of tracks corresponding to the run length. The first and the second code generate a Gray code.

These and other features and advantages will be apparent from a reading of the following detailed description.

BRIEF DESCRIPTION OF DRAWINGS

FIGS. 1A-1C show an encoding scheme according to one aspect of the present embodiments.

FIG. 2A-2C show a decoding scheme according to one aspect of the present embodiments.

DETAILED DESCRIPTION

Figure 1A:
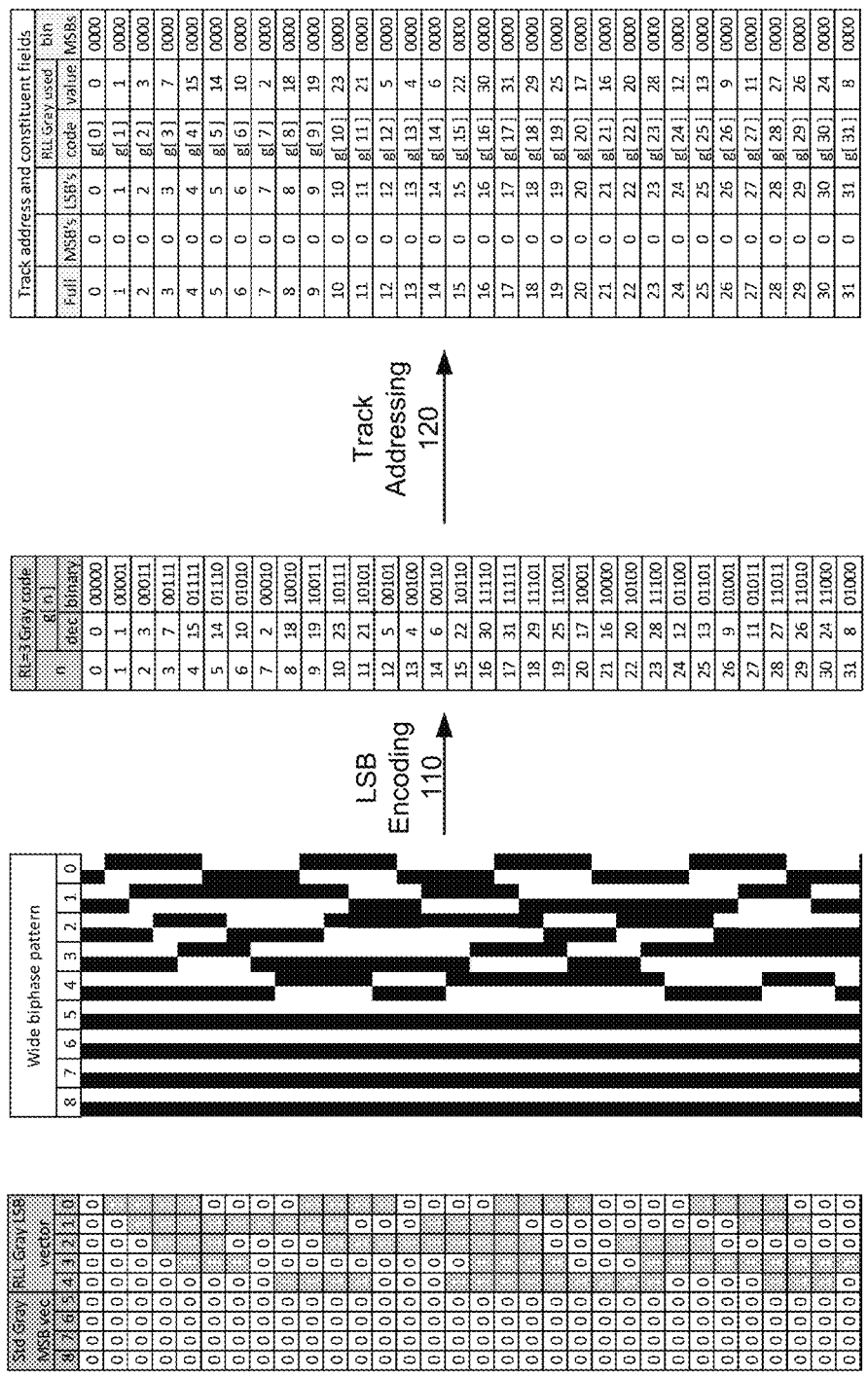

Before some particular embodiments are provided in greater detail, it should be understood that the particular embodiments provided herein do not limit the concepts provided herein, as features in such particular embodiments may vary. It should likewise be understood that a particular embodiment provided herein has features that may be readily separated from the particular embodiment and optionally combined with or substituted for features in any of several other embodiments provided herein.

Some portions of the detailed descriptions that follow are presented in terms of procedures, logic blocks, processing, and other symbolic representations of operations on data bits within a computer memory. These descriptions and representations are the means used by those in the data processing arts and data communication arts to most effectively convey the substance of their work to others. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "storing," "determining," "sending," "receiving," "transmitting," "communicating," "providing," "accessing," "associating," "disabling," "enabling," "configuring," "initiating," "starting," "terminating," "ending," "maintaining," "encoding," "decoding," "writing," "reading," "storing," "accessing," "initializing," "updating" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a hard drive, distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), hard drive, electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

It should also be understood that the terminology used herein is for the purpose of describing some particular embodiments, and the terminology does not limit the concepts provided herein. Unless indicated otherwise, ordinal numbers (e.g., first, second, third, etc.) are used to distinguish or identify different elements or steps in a group of elements or steps, and do not supply a serial or numerical limitation. For example, "first," "second," and "third" elements or steps need not necessarily appear in that order, and embodiments need not necessarily be limited to the three elements or steps. It should be understood that the singular forms of "a," "an," and "the" include plural references unless the context clearly dictates otherwise.

Unless defined otherwise, all technical and scientific terms used herein have the same meaning as commonly understood by those of ordinary skill in the art.

A need has arisen to encode the servo field track of a media using Gray codes while distributing the change in bit values more evenly among all order bits in order to enable writing technologies such as EBW without violating the minimum feature sizes, especially as feature sizes become smaller. Moreover, a need has arisen to improve data reads in embodiments where the reader width is large in comparison to the track pitch, e.g., two dimensional magnetic recording (TDMR) application. Provided herein is an encoding scheme to encode a first portion of the servo field associated with a track using one encoding scheme and encoding the second portion of the servo field associated with the same track using another encoding scheme to generate a Gray code servo field. The encoding scheme provided herein distributes the change of bit value more evenly among all order bits of the servo field.

Figure 1B:
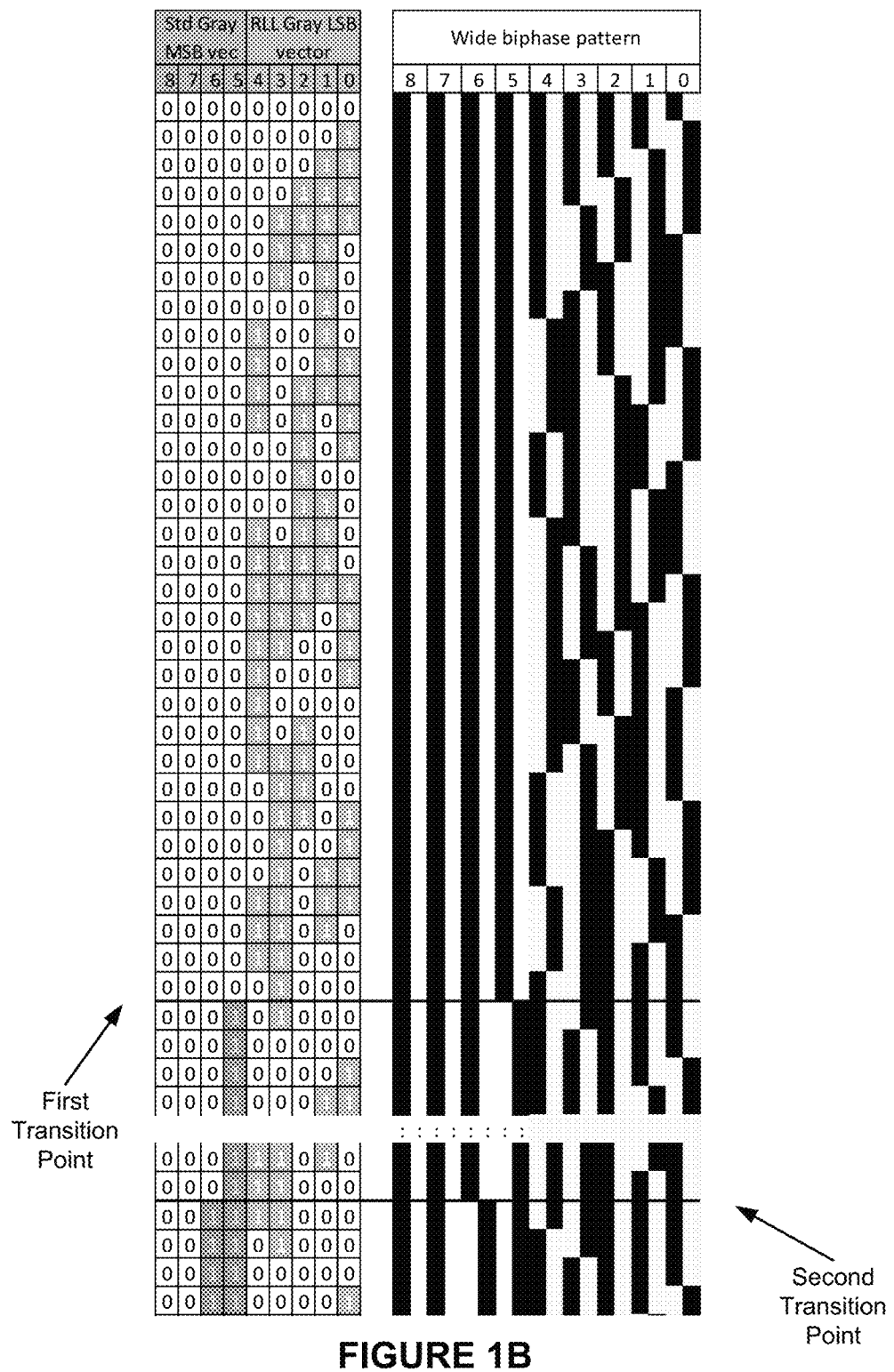

Referring now to FIGS. 1A-1C, an encoding scheme according to some embodiments is shown. Referring more specifically to FIG. 1A, a first aspect of an encoding scheme according to some embodiments is shown. The servo tracks' addresses are represented by bits, 1s and 0s. For example, a 0 track address may be represented by 8 bits of 0. A first track address may be represented as 00000001. The second track address may be represented as 00000011 and so forth. It is noteworthy that the addresses are based on Gray codes such that any two adjacent tracks have a hamming distance of 1, meaning that all bits except for one are the same.

As mentioned above, in conventional methods the least order bit changes value at every other track, which becomes a challenge satisfying the minimum feature size required by EBW. According to embodiments presented herein a new Gray encoding scheme is introduced to more evenly distribute the changing bits in order. As feature size becomes smaller, the new Gray encoding scheme is able to use writing schemes such as EBW, while satisfying minimum feature size constraints. According to some embodiments, the servo track address may be partitioned to a plurality of portions, e.g., 2 portions for illustrative purposes. The lower order bits of the servo track address are referred to as run length limited (RLL) Gray least significant bits vector. The higher order bits of the servo track address are referred to as standard Gray most significant bits vector. In this illustrative example, the first portion that corresponds to the higher bits of the servo track address may be 4 bits long and the second portion corresponding to the lower order bits of the servo track referred to as RLL Gray least significant bits (LSB) vector may be 5 bits long. However, the use of 4 and 5 bits for the first and the second portions respectively is for illustration purposes and should not be construed as limiting the embodiments. It is appreciated that different portions do not have to be physically separated from one another and that the bits of the vector may be interspersed. For example, the first portion may include the highest ordered bit and the third highest ordered bit whereas the second portion may include the remaining bits. As such, the discussion with respect to the first portion and the second portion that are in consecutive order should not be construed as limiting the scope of the embodiments.

The standard Gray encoding scheme may be for example an exclusive OR operation between bits of the vector. For example, $g[0]=XOR(B_1,B_0)$ where the binary track for the decimal track number is $B_n B_{n-1} \ldots B_2 B_1 B_0$. Similarly $g[1]=XOR(B_2,B_1)$, $g[n-1]=XOR(B_n,B_{n-1})$, and $g[n]=B_n$. The first portion of the servo track may be encoded based on the standard Gray encoding scheme. It is appreciated that the first portion of the servo track may be encoded based on other Gray encoding schemes and the discussion with respect to the standard Gray encoding scheme is for illustrative purposes and should not be construed as limiting the scope of the embodiments.

The second portion of the servo track or the RLL Gray least significant bits vector may be encoded using a different Gray encoding scheme. In this illustrative embodiment the RLL associated with the RLL Gray least significant bits vector is 3. As such, every bit in the RLL Gray least significant bits vector maintains its value without changing for at least 3 tracks. For example, as illustrated in FIG. 1A, the least significant bit 0 of the RLL Gray LSB vector for tracks 1-4 remains 1 and then it changes for track 5 and maintains its value until track 9 where it changes value again. Similarly, bit 2 of the RLL Gray LSB vector for tracks 4-6 remains the same and changes value at track 7 and maintains the same until track 16 where it changes value. Other bits in the RLL Gray LSB vector also behave similar to the ones mentioned above. As illustrated every bit order maintains its value for at least 3 tracks before it changes value. As such, the change of bit values has been distributed more evenly between the 5 bit vector while maintaining the Grayness of the vectors. As illustrated the hamming distance of the RLL Gray LSB vector is 1, and is therefore a Gray code.

The encoding of the Gray code for the first portion and the second portion is shown as a wide bi-phase pattern. However, other patterns may be used.

At 110, the RLL Gray LSB vectors may be encoded based on the Gray code with a run length of 3. The RLL Gray encodings of LSB values are shown as decimal numbers and binary vectors. For example, servo track 0 is represented in a Gray code having an RLL of 3 by the binary vector 00000, corresponding to a decimal value of 0. Servo track 15 is represented by the RLL Gray encoded vector of 10110, corresponding to a decimal value of 22. Servo track 26 is represented by the RLL Gray encoded vector of 01001, corresponding to a decimal value of 9, and so forth. At 120, track numbers, MSBs and LSBs values, and encoding values for the LSBs based on the RLL Gray LSB vectors, and the MSB vectors are shown.

It is appreciated that the values for the encoded RLL Gray LSB may repeat themselves after a certain number of servo tracks based on the RLL Gray LSB code used as well as its associated code length. For example, in this illustrative embodiment, the values repeat themselves after 32 servo tracks. It is appreciated that the number of servo tracks after which the RLL Gray LSB code repeats itself may be referred to as the code length.

Referring now to FIG. 1B, further servo tracks encoding that is continuation of FIG. 1A is shown. As described above, since the encoded values for the RLL Gray LSB vectors repeat themselves after 32 servo tracks, referred to as code length, in this embodiment, at the transition point between servo track 31 and 32 because the vectors must remain Gray, instead of changing a bit within the LSB vector, a bit within the standard Gray MSB vector is changed. For example, the RLL Gray LSB vector of tracks 31 and 32 remain the same, while one bit in the first portion of the servo track is changed, e.g., the least significant order bit of the MSB vector changes from 0 to 1. In FIG. 1B, the portions where the RLL Gray LSB vectors are kept the same but a bit within the MSB vector is changed is referred to as first transition point, second transition point, etc. After the MSB vector changes then the MSB vectors remain unchanged and the RLL Gray LSB will repeat itself, as presented above. For example, for tracks 32-63 the MSB vector remains the same while the RLL Gray LSB repeats itself until the second transition point between tracks 63 and 64, at which point the process described in FIG. 1B is repeated again. It is appreciated that the MSB vector that corresponds to the first portion may change according to the standard Gray encoding scheme described above. However, it is appreciated that the MSB vector corresponding to the first portion may change according to other Gray encoding schemes and the description with respect to the standard Gray encoding scheme is exemplary and not intended to limit the scope of the embodiments.

Referring now to FIG. 1C, the description of the process in FIGS. 1A-1B but for tracks 31 through 98 is shown. As discussed, the RLL Gray LSB repeats itself and it is kept unchanged at transition points where the MSB changes value in order to maintain Grayness of the codes. The first transition point at track 31 and the second transition point at track 63 are labeled and shown. It is appreciated that other transition points are present (even though they are not shown). For example, the third transition point occurs at track 95. It is also appreciated, that similar to the discussion above with respect to the second portion, every order bit in the first portion maintains its value without changing for at least 3 consecutive tracks also referred to as run length.

Figure 2A:
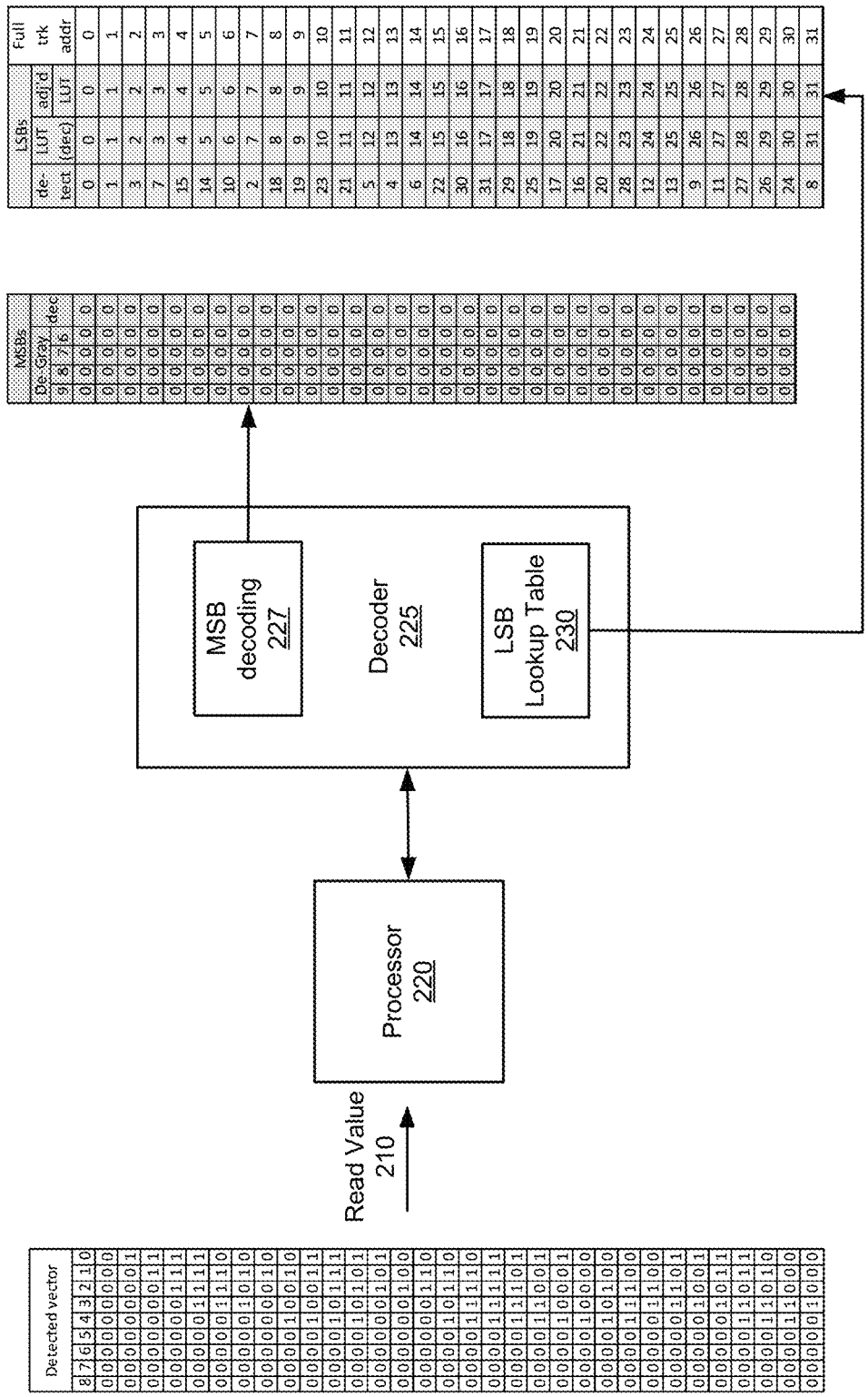
Figure 2C:
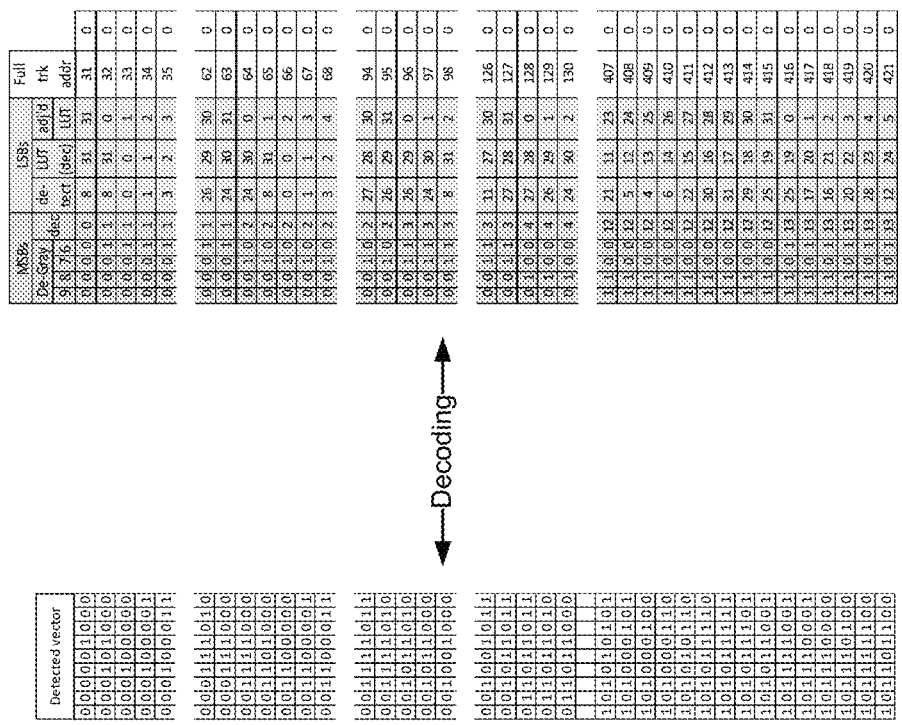

Referring now to FIG. 2A-2C, a decoding scheme according to some embodiments is shown. Encoded servo track values are read by, for example, a head. As such, the read values 210 are transmitted to the processor 220. It is appreciated that the read values 210 may be detected vectors. The processor may communicate the read values 210 to a decoder 225. It is appreciated that the decoder 225 may have an MSB decoding 227 component for decoding the read value associated with the MSB portion, e.g., the first portion, and may use a decoder, e.g., LSB lookup table 230, for decoding the read values associated with the LSB portion, e.g., the second portion.

It is appreciated that the MSB decoding 227 component may be based on the standard de-Gray decoding process. The standard de-Gray decoding scheme may be for example an exclusive OR operation. For example, $B_n=g_n$, which is the read value. Similarly, $B_{n-1}=XOR(B_n,g_{n-1})$, ... $B_1=XOR(g_1,B_2)$, and $B_0=XOR(g_0,B_1)$. Accordingly, the first portion of the servo track may be decoded. It is appreciated that the first portion of the servo track may be decoded based on other Gray decoding schemes if a different encoding scheme is used. As such, the discussion with respect to the standard Gray decoding scheme is for illustrative purposes and should not be construed as limiting the scope of the embodiments. The MSB decoding 227 component generates the MSB de-Gray decoded vectors, e.g., the first 32 tracks are shown here for illustrative purposes.

In some embodiments, the decoder for the LSB portion may be a LSB lookup table 230. LSB lookup table 230 may speed up the decoding process because as presented above the LSB vector repeats itself based on the RLL Gray LSB code used as well as its associated code length. As such, using a lookup table for faster lookup rather than processing to decode the read values based on mathematical equations and operations may be faster. However, in some embodiments, decoding operations based on mathematical operations may be performed instead of using a lookup table and the description of a lookup table is for illustrative purposes and not intended to limit the scope of the embodiments.

In this illustrative embodiment, the read value, e.g., LSB vector 01111, associated with the second portion is received. The decimal value 15 for the LSB vector 01111 is obtained. The decimal value 15 is decoded by using the lookup table 230. The decoded value is 4. Similarly, if the read value, e.g., LSB vector 11100, associated with the second portion is received. The decimal value 28 is decoded by using the lookup table 230. The decoded value is 23. It is appreciated that other read values are decoded as described above before the Gray code for LSBs repeat themselves, therefore before the transition points. It is appreciated that because the LSBs are kept the same from the previous servo track to the next consecutive servo track, at transition points, in order to correctly decode the read values, the MSB vector value is used.

According to some embodiments, the track number and the associated detected vector may be based on the following equation:

Track Number=(MSB decoded value)×(code length)+(MSB decoded value+LSB decoded value) % (code length).

For example, if the read MSB value is 1 and the read LSB value is 3, then it is determined that the associated servo track is 35 because 1 (MSB value)×32 (code length)+[1 (MSB value)+2 (decoded value for read LSB value of 3)]% 32=35. In other examples, if the read MSB value is 3 and the read LSB value is 8, then it is determined that the associated servo track is 98 because 3 (MSB value)×32 (code length)+[3 (MSB value)+31 (decoded value for read LSB value of 8)]% 32=98.

Accordingly, the track number may be determined by decoding the read MSB values and further by decoding the read LSB values. The full detected vectors 210 that is read may be input to the processor 220 and/or the decoder 225. In FIG. 2A, only the first 32 tracks are shown. As such, the results account for the transition points.

Referring now to FIG. 2B, the lookup table 230 is shown. The lookup table 230 may store the association between the encoded value and the track number. The first column may represent the encoded values and the second column shows the corresponding track numbers. For example, the encoded value 24 is decoded to track number 30, the encoded value 17 is decoded to track number 20, etc. It is appreciated that the lookup table 230 may include 32 entries, as presented herein, because the RLL Gray LSB in this illustrative embodiment has a code length of 32, which means it repeats itself after 32 consecutive servo tracks. Thus, only 32 encoded values need to be stored. It is appreciated that RLL Gray LSB according to other embodiments, using different number of least significant bits, different run length, etc. may result in a different code length. As such, the description of the code length of 32, is merely illustrative and not intended to limit the scope of the embodiments.

Accordingly, embodiments described above present a new Gray encoding/decoding scheme to more evenly distribute the changing bits in order to be able to use writing schemes such as EBW while satisfying minimum feature size constraints as feature size become smaller.

It is appreciated that a LUT selection and its construct may be used to impose a different run length constraint on the bits depending on their values. For example, a first run length, e.g., 5, may be imposed on a bit that has a value of 1 and a second run length, e.g., 2, may be imposed on a bit that a value of 0. In other words, imposing different constraints in the described manner maintains the bit value unchanged for 5 consecutive tracks when the bit has a value of 1 and it maintains the bit value unchanged for 2 consecutive tracks when the bit has a value of 0.

It is appreciated that selection of the Gray code for the first portion, the second portion, or any combination thereof and the LUT may be done to more intelligently detect errors. For example, selection of the Gray encoding and the LUT associated therewith may be performed in such a way to ensure that there is the largest minimum numerical distance between the actual track number and the detected number when there is an error in the recovery of the bits. In other words, a processor may determine that the read value is more likely to contain an error if the read value results in a decoded track number that is many tracks away from the previous read track number because errors usually result from straddling of the reader between two tracks and further because Gray codes are used and any two consecutive servo track are only different from one another by one bit. Similarly, a processor may determine that the read value is less likely to contain an error if the read value results in a decoded track number that is close to the track number of the previously read track number because errors usually result from straddling of the reader between two tracks and further because Gray codes are used and any two consecutive servo track are only different from one another by one bit.

Figure 3:
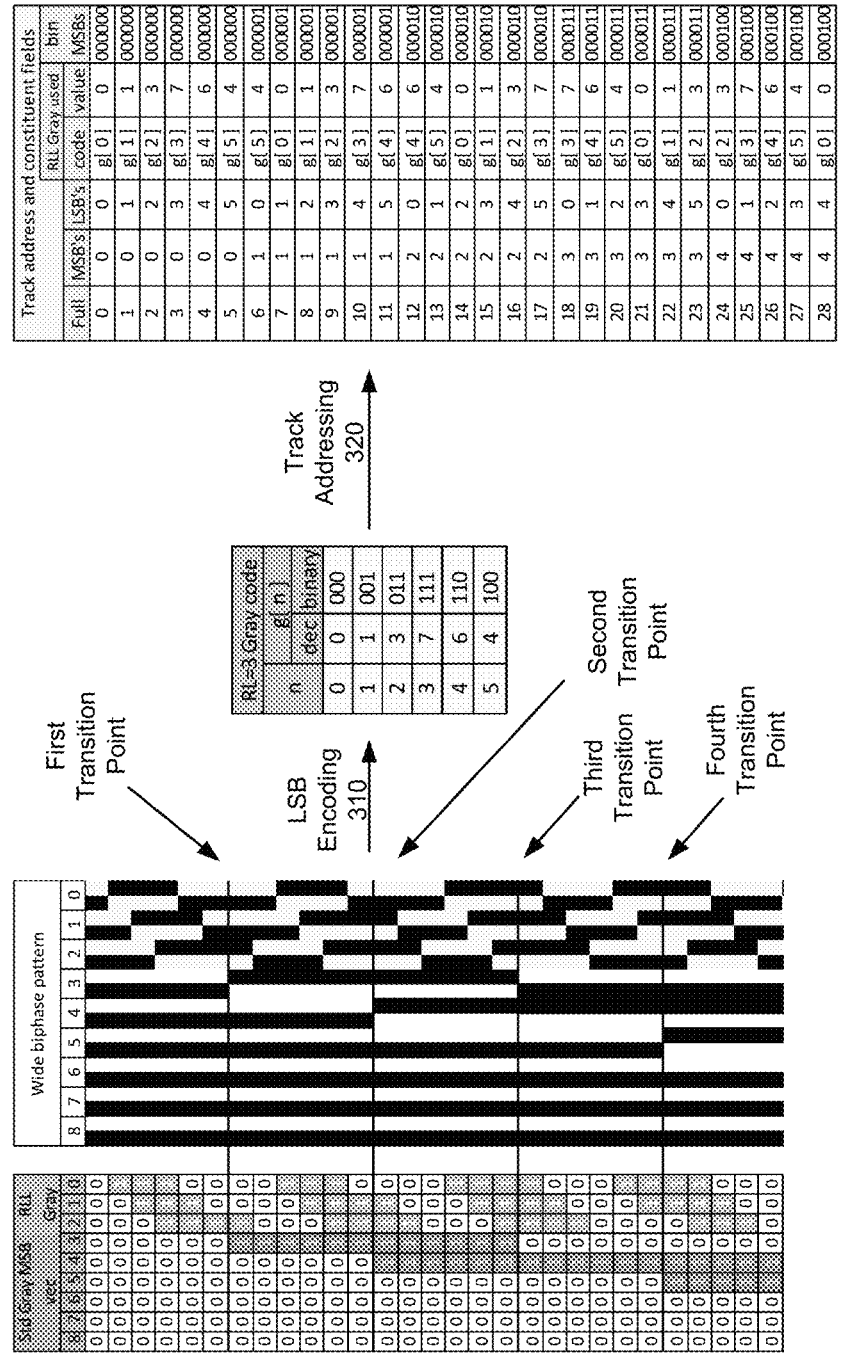
FIG. 3 shows another encoding scheme according to one aspect of the present embodiments.

Referring now to FIG. 3, another encoding scheme according to some embodiments is shown. The embodiment discussed here is similar to that of FIGS. 1A-1C, however, in this embodiment, the first portion corresponding to the MSBs is 6 bits and the second portion corresponding to the LSBs is 3 bits. It is appreciated that the first portion corresponding to the MSBs may be encoded similar to that described above in FIG. 1A.

The second portion of the servo track or the RLL Gray least significant bits vector may be encoded using a different Gray encoding scheme. The second portion which corresponds to the lower order bits of the servo track addresses has a run length of 3 and a code length of 6. In other words, the RLL Gray encoding scheme repeats itself every 6 servo tracks. As such, every bit in the RLL Gray least significant bits vector maintain its value without changing for at least 3 tracks. For example, as illustrated the least significant bit 0 of the RLL Gray LSB vector for tracks 1-3 remains 1 and then it changes for track 4 and maintains its value until track 8 where it changes value again. Similarly, bit 1 of the RLL Gray LSB vector for tracks 2-4 remains the same and changes value at track 5 and maintains the same until track 9 where it changes value. Other bits in the RLL Gray LSB vector also behave similarly to the ones mentioned above. As illustrated every bit order maintains its value for at least 3 tracks before it changes value. As such, the change of bit values has been distributed more evenly between the 3 bit vector while maintaining the Grayness of the vectors. As illustrated the hamming distance of the RLL Gray LSB vector is 1, and is therefore a Gray code.

The encoding of the Gray code for the first portion and the second portion is shown as a wide bi-phase pattern. However, other patterns may be used as well. The first, second, third and fourth transition points are illustrated.

At 310, the RLL Gray LSB vectors may be encoded based on the Gray code with a run length of 3. The RLL Gray LSB vectors are shown in binary and their encoded values are shown. For example, for servo track 0 may be encoded as the LSB vector of 000 having a decimal value of 0 using the Gray code with RLL of 3. In contrast, servo track 15 may be encoded by the LSB vector of 001 and it may have a value of 1. Moreover, the servo track 26 may be encoded by the LSB vector of 110 with a value of 2 and so forth. At 320, track numbers, MSBs and LSBs values, and encoding values for the LSBs based on the RLL Gray LSB vectors, and the MSB vectors are shown.

It is appreciated that the values for the encoded RLL Gray LSB may repeat themselves after a certain number of servo tracks based on the RLL Gray LSB code used as well as its associated run length. For example, in this illustrative embodiment, the values repeat themselves after 6 servo tracks. It is appreciated that the number of servo tracks after which the RLL Gray LSB code repeats itself may be referred to as the code length. As described above, since the encoded values for the RLL Gray LSB vectors repeat themselves after 6 servo tracks, referred to as code length, in this embodiment, at the transition point between servo track 5 and 6 because the vectors must remain Gray, instead of changing a bit within the LSB vector, a bit within the standard Gray MSB vector is changed. For example, the RLL Gray LSB vector of tracks 5 and 6 remains the same, while one bit in the first portion of the servo track is changed, e.g., the least significant order bit of the MSB vector changes from 0 to 1. Moreover, the portions where the RLL Gray LSB vectors are kept the same but a bit within the MSB vector is changed is referred to as first transition point, second transition point, etc. After the MSB vector changes then the MSB vectors remain unchanged and the RLL Gray LSB will repeat itself, as presented above. For example, for tracks 6-11 the MSB vector remains the same while the RLL Gray LSB repeats itself until the second transition point, at which point the process is repeated again. It is appreciated that the MSB vector that corresponds to the first portion may change according to the standard Gray encoding scheme described above. However, it appreciated that the MSB vector corresponding to the first portion may change according to other Gray encoding schemes and the description with respect to the standard Gray encoding scheme is exemplary and not intended to limit the scope of the embodiments.

At 320, the track addressing for tracks 0-28 is shown. As discussed, the RLL Gray LSB repeats itself and it is kept unchanged at transition points where the MSB changes value in order to maintain Grayness of the codes. The first transition point at track 5, the second transition point at track 11, the third transition point at track 17, etc., are labeled and shown.

Figure 4:
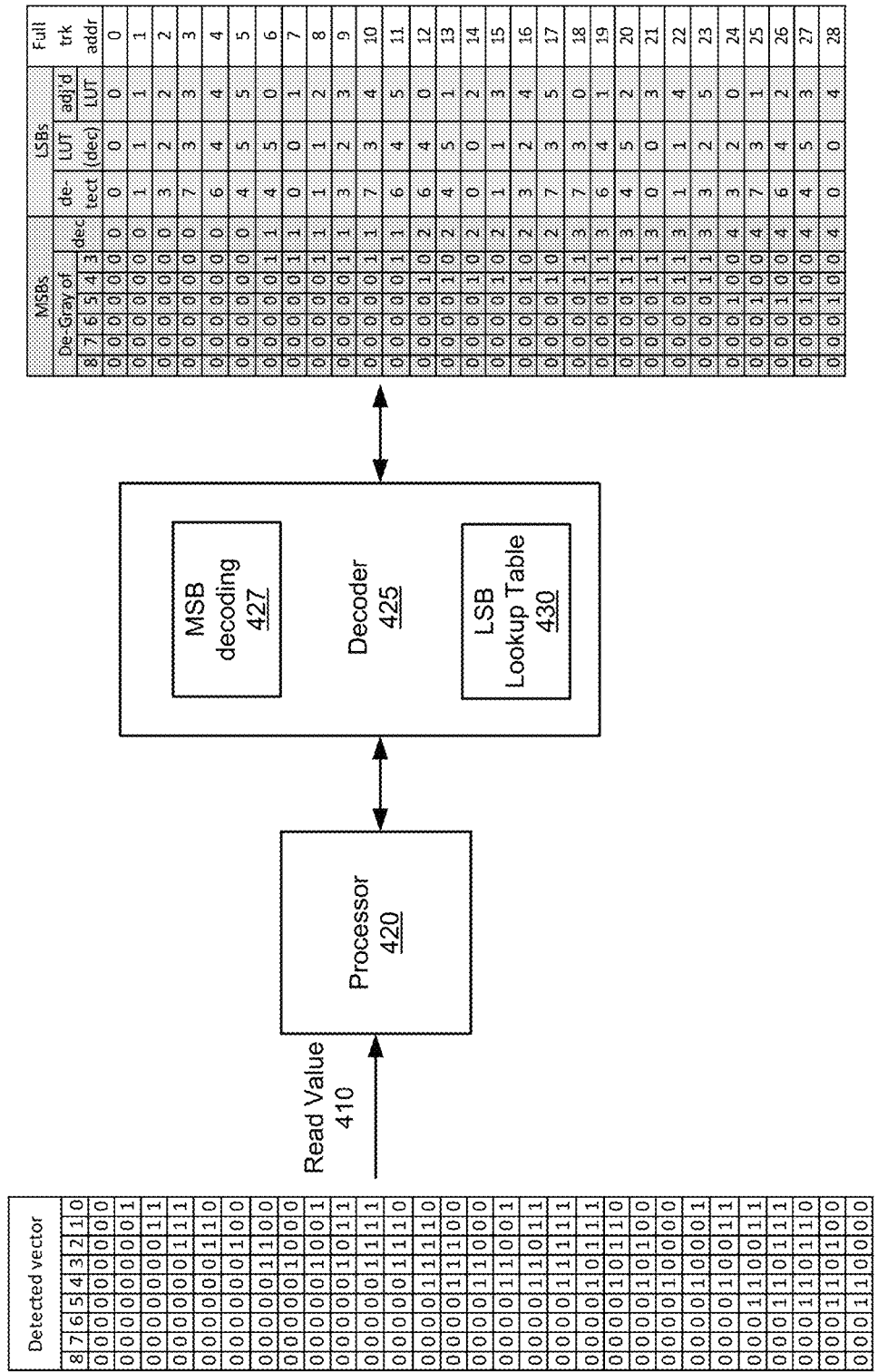
FIG. 4 shows another decoding scheme according to one aspect of the present embodiments.

Referring now to FIG. 4, another decoding scheme according to some embodiments is shown. Encoded servo track values is read by, for example, a head. As such, the read values 410, e.g., represented as the detected vectors, are transmitted to the processor 420. The processor may communicate the read values 410 to a decoder 425. It is appreciated that the decoder 425 may have an MSB decoding 427 component for decoding the read value associated with the MSB portion, e.g., the first portion, and may use a decoder, e.g., lookup table 430, for decoding the read values associated with the LSB portion, e.g., the second portion.

It is appreciated that the MSB decoding 427 component may be based on the standard de-Gray decoding process. The standard de-Gray decoding scheme may be for example an exclusive OR operation. For example, $B_n = g_n$, which is the read value. Similarly, $B_{n-1} = XOR(B_n, g_{n-1})$, $B_1 = XOR(g_1, B_2)$, and $B_0 = XOR(g_0, B_1)$. Accordingly, the first portion of the servo track may be decoded. It is appreciated that the first portion of the servo track may be decoded based on other Gray decoding schemes if a different encoding scheme is used. As such, the discussion with respect to the standard Gray decoding scheme is for illustrative purposes and should not be construed as limiting the scope of the embodiments. The MSB decoding 427 component generates the MSB de-Gray decoded vectors, e.g., the first 28 tracks are shown here for illustrative purposes.

In some embodiments, the decoder for the LSB portion may be a LSB lookup table 430. LSB lookup table 430 may speed up the decoding process because as presented above LSB vector repeats itself based on the RLL Gray LSB code used as well as its associated code length. As such, using a lookup table for faster lookup rather than processing to decode the read values based on mathematical equations and operations may be faster. However, in some embodiments, decoding operations based on mathematical operations may be performed instead of using a lookup table and the description of a lookup table is for illustrative purposes and not intended to limit the scope of the embodiments.

In this illustrative embodiment, the read value, e.g., LSB vector 111, associated with the second portion may be received. The LSB vector in this example may have a decimal value 7. The lookup table 430 may be used to decode the decimal value 7. The decoded value is 3. Similarly, the read value, e.g., LSB vector 100, associated with second portion is received. The LSB vector in this example may have a decimal value 4. The lookup table 430 may be used to decode the read decimal value 4. The decoded value is 5. It is appreciated that other read values are decoded as described above before the Gray code for LSBs repeat themselves, therefore before the transition points. It is appreciated that because the LSBs are kept the same from the previous servo track to the next consecutive servo track, at transition points, in order to correctly decode the read values, the MSB vector value is used.

According to some embodiment, the track number and the associated detected vector may be based on the following equation:

Track Number=(MSB decoded value)×(code length)+(MSB decoded value+LSB decoded value) % (code length).

For example, if the read MSB value is 1 and the read LSB value is 7, then it is determined that the associated servo track is 10 because 1 (MSB value)×6 (code length)+[1 (MSB value)+3 (decoded value for read LSB value of 7)]% 6=10. In other examples, if the read MSB value is 3 and the read LSB value is 4, then it is determined that the associated servo track is 20 because 3 (MSB value)×6 (code length)+[3 (MSB value)+5 (decoded value for read LSB value of 4)]% 6=20.

Accordingly, the track number may be determined by decoding the read MSB values and further by decoding the read LSB values. The full detected vectors 410 may be read and input to the processor 420 and/or the decoder 425. It is appreciated that only the first 28 tracks are shown. As such, the track address may be obtained. As such, the transition points are accounted for when determining the track number and the associated vector.

Figure 5:
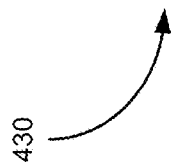
FIG. 5 shows a lookup table according to one aspect of the present embodiments.

Referring now to FIG. 5, a lookup table 430 according to some embodiments is shown. The lookup table 430 may store the association between the encoded value and the track number. The first column may represent the encoded values and the second column shows the corresponding track numbers. For example, the encoded value 3 is decoded to track number 2, the encoded value 6 is decoded to track number 4, the encoded value 7 is decoded to track 5, etc. It is appreciated that the lookup table 430 may include 6 entries, as presented herein, because the RLL Gray LSB in this illustrative embodiment has a code length of 6, which means it repeats itself after 6 servo tracks. Thus, only 6 encoded values need to be stored. It is appreciated that RLL Gray LSB according to other embodiments, using different numbers of least significant bits, different run length, etc. may result in a different code length. As such, the description of the code length of 6, is merely illustrative and not intended to limit the scope of the embodiments.

Accordingly, embodiments described above present a new Gray encoding/decoding scheme to more evenly distribute the changing bits in order to be able to use writing schemes such as EBW while satisfying minimum feature size constraints as feature size become smaller.

Figure 6:
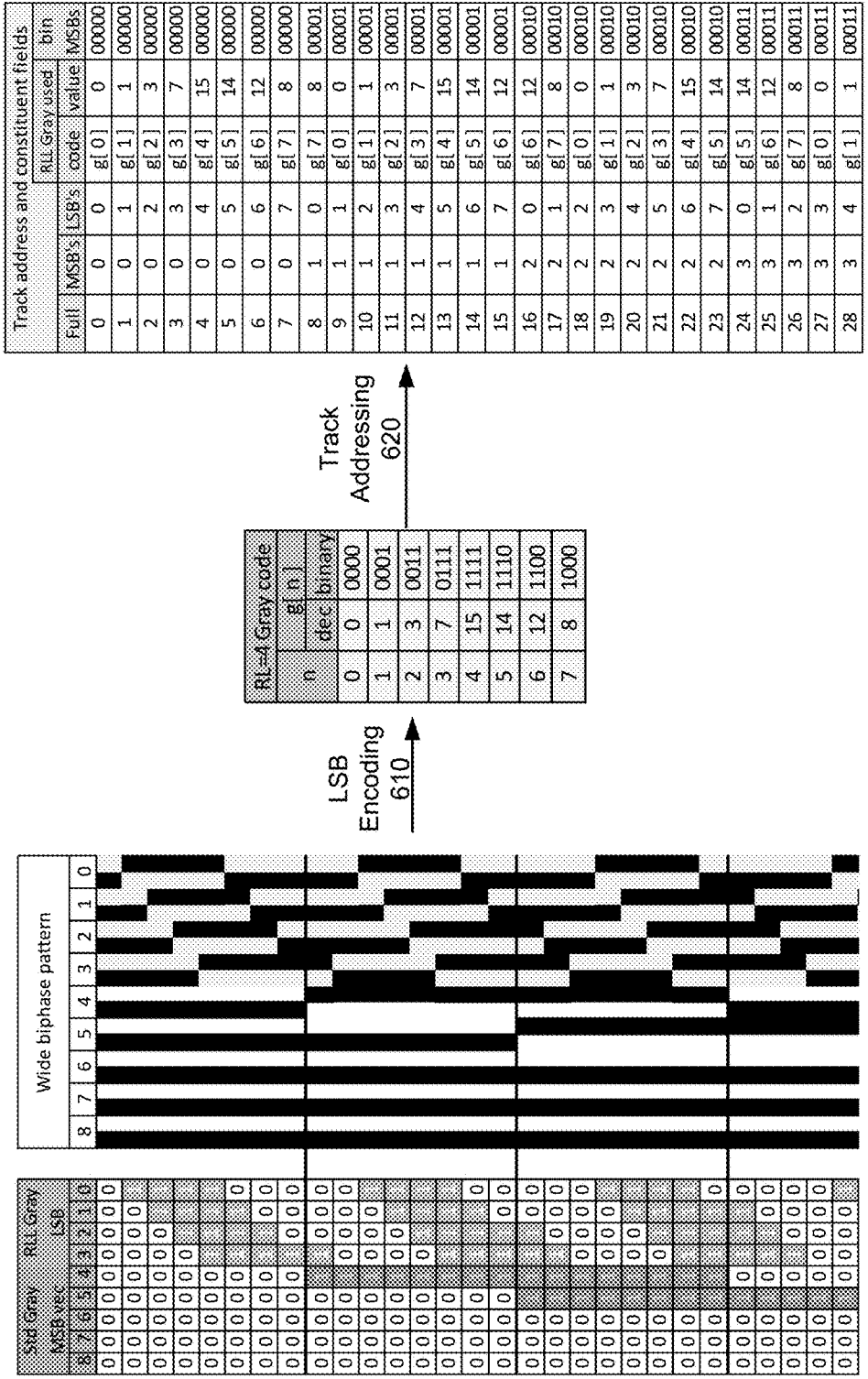
FIG. 6 shows yet another encoding scheme according to one aspect of the present embodiments.

Referring now to FIG. 6, yet another encoding scheme according to some embodiments is shown. The embodiment discussed here is similar to that of FIGS. 1A-1C, however, in this embodiment, the first portion corresponding to the MSBs is 4 bits and the second portion corresponding to the LSBs is 4 bits. It is appreciated that the first portion corresponding to the MSBs may be encoded similarly to that described above in FIG. 1A.

The second portion of the servo track or the RLL Gray least significant bits vector may be encoded using a different Gray encoding scheme. The second portion which corresponds to the lower order bits of the servo track addresses has a run length of 4 and a code length of 8. In other words, the RLL Gray encoding scheme repeats itself every 8 servo tracks. As such, every bit in the RLL Gray least significant bits vector maintains its value without changing for at least 4 tracks. For example, as illustrated the least significant bit of the RLL Gray LSB vector for tracks 1-4 remains 1 and then it changes for track 5 and maintains its value until track 10 where it changes value again. Similarly, bit 1 of the RLL Gray LSB vector for tracks 2-5 remains the same and changes value at track 6 and maintains the same until track 11 where it changes value. Other bits in the RLL Gray LSB vector also behave similarly to the ones mentioned above. As illustrated every bit order maintains its value for at least 4 tracks before it changes value. As such, the change of bit values has been distributed more evenly between the 4 bit vector while maintaining the Grayness of the vectors. As illustrated the hamming distance of the RLL Gray LSB vector is 1, and is therefore a Gray code.

The encoding of the Gray code for the first portion and the second portion is shown as a wide bi-phase pattern. However, other patterns may be used as well. The first, second, and third transition points are illustrated.

At 610, the RLL Gray LSB vectors may be encoded based on the Gray code with a run length of 4. The RLL Gray LSB vectors are shown in binary and their encoded values are shown. For example, for servo track 0 may be encoded into the LSB vector of 0000 and the encoded value of 0 using the Gray code with RLL of 4. In contrast, servo track 15 may be encoded into the LSB vector of 1100 and the encoded value of 12. Moreover, the servo track 26 may be encoded into the LSB vector of 1000 with a value of 8 and so forth. At 620, track numbers, MSBs and LSBs values, and encoding values for the LSBs based on the RLL Gray LSB vectors, and the MSB vectors are shown.

It is appreciated that the values for the encoded RLL Gray LSB may repeat themselves after a certain number of servo tracks based on the RLL Gray LSB code used as well as its associated code length. For example, in this illustrative embodiment, the values repeat themselves after 8 servo tracks. It is appreciated that the number of servo tracks after which the RLL Gray LSB code repeats itself may be referred to as the code length. As described above, since the encoded values for the RLL Gray LSB vectors repeat themselves after 8 servo tracks, referred to as code length, in this embodiment, at the transition point between servo track 7 and 8 because the vectors must remain Gray, instead of changing a bit within the LSB vector, a bit within the standard Gray MSB vector is changed. For example, the RLL Gray LSB vector of tracks 7 and 8 remains the same, while one bit in the first portion of the servo track is changed, e.g., the least significant order bit of the MSB vector changes from 0 to 1. Moreover, the portions where the RLL Gray LSB vectors are kept the same but a bit within the MSB vector is changed is referred to as first transition point, second transition point, etc. After the MSB vector changes then the MSB vectors remain unchanged and the RLL Gray LSB will repeat itself, as presented above. For example, for tracks 8-15 the MSB vector remains the same while the RLL Gray LSB repeats itself until the second transition point, at which point the process is repeated again. It is appreciated that the MSB vector that corresponds to the first portion may change according to the standard Gray encoding scheme described above. However, it appreciated that the MSB vector corresponding to the first portion may change according to other Gray encoding schemes and the description with respect to the standard Gray encoding scheme is exemplary and not intended to limit the scope of the embodiments.

At 620, the track addressing for tracks 0-28 is shown. As discussed, the RLL Gray LSB repeats itself and it is kept unchanged at transition points where the MSB changes value in order to maintain Grayness of the codes. The first transition point at track 7, the second transition point at track 15, the third transition point at track 23, etc., are labeled and shown.

Figure 7:
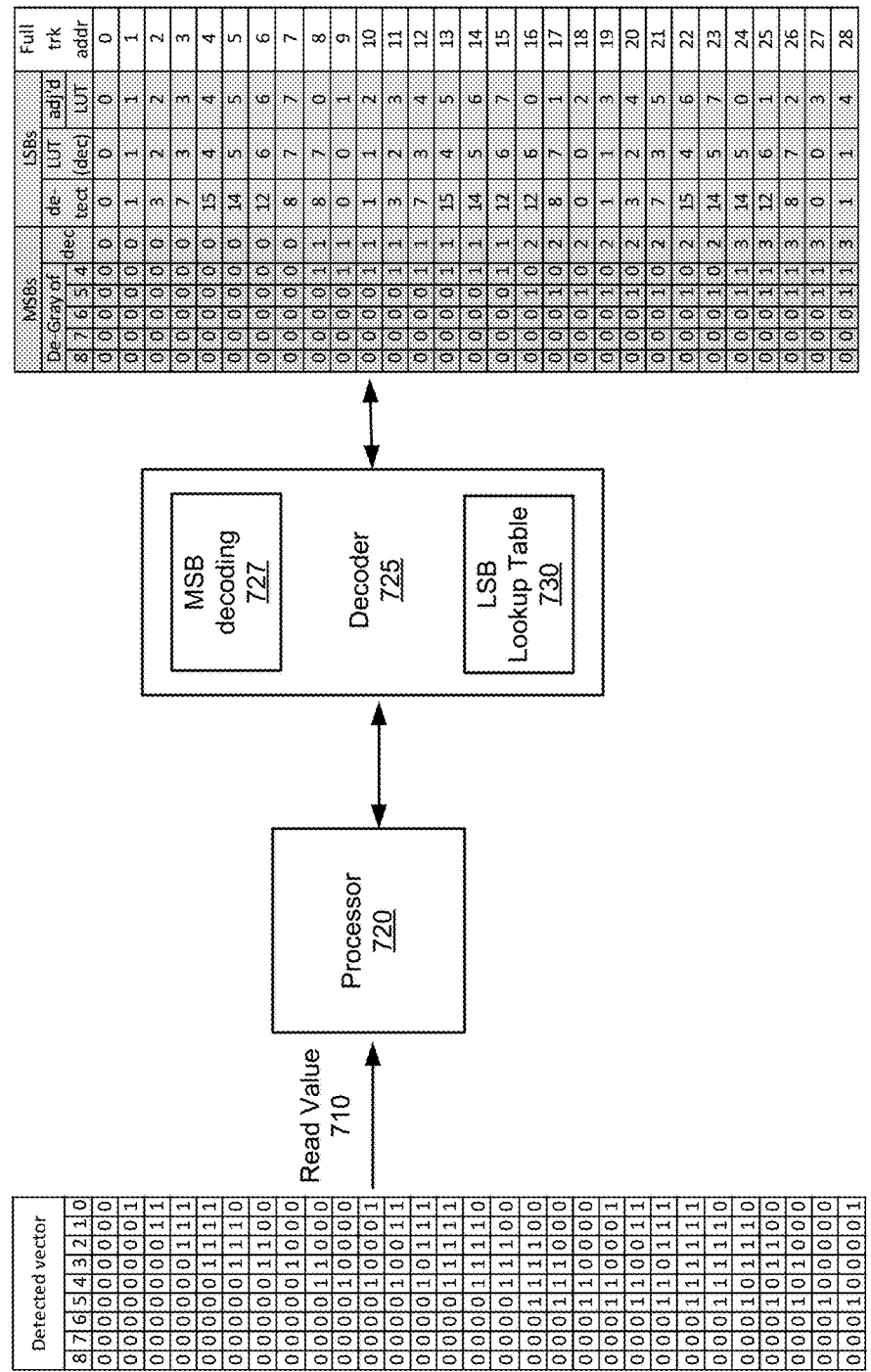
FIG. 7 shows yet another decoding scheme according to one aspect of the present embodiments.

Referring now to FIG. 7, another decoding scheme according to some embodiments is shown. Encoded servo track values are read by, for example, a head. As such, the read values 710 are transmitted to the processor 720. The processor may communicate the read values 710 to a decoder 725. It is appreciated that the decoder 725 may have an MSB decoding 727 component for decoding the read value associated with the MSB portion, e.g., the first portion, and may use a decoder, e.g., lookup table 730, for decoding the read values associated with the LSB portion, e.g., the second portion.

It is appreciated that the MSB decoding 727 component may be based on the standard de-Gray decoding process. The standard de-Gray decoding scheme may be for example an exclusive OR operation. For example, $B_n=g_n$, which is the read value. Similarly, $B_{n-1}=XOR(B_n,g_{n-1})$, $B_1=XOR(g_1, B_2)$, and $B_0=XOR(g_0, B_1)$. Accordingly, the first portion of the servo track may be decoded. It is appreciated that the first portion of the servo track may be decoded based on other Gray decoding schemes if a different encoding scheme is used. As such, the discussion with respect to the standard Gray decoding scheme is for illustrative purposes and should not be construed as limiting the scope of the embodiments. The MSB decoding 427 component generates the MSB de-Gray decoded vectors, e.g., the first 28 tracks are shown here for illustrative purposes.

In some embodiments, the decoder for the LSB portion may be a LSB lookup table 730. LSB lookup table 730 may speed up the decoding process because as presented above the LSB vector repeats itself based on the RLL Gray LSB code used as well as its associated code length. As such, using a lookup table for faster lookup rather than processing to decode the read values based on mathematical equations and operations may be faster. However, in some embodiments, decoding operations based on mathematical operations may be performed instead of using a lookup table and the description of a lookup table is for illustrative purposes and not intended to limit the scope of the embodiments.

In this illustrative embodiment, the read value, e.g., LSB vector 0111, associated with the second portion is received. The read LSB vector 0111 may have a decimal value 7. The lookup table 730 may be used to decode the decimal value 7. The decoded value is 3. Similarly, the read value, e.g., LSB vector 1111, associated with the second portion is received. The read LSB vector 1111 may have a decimal value 15. The lookup table 730 may be used to decode the read decimal value of 15. The decoded value is 4. It is appreciated that other read values are decoded as described above before the Gray code for LSBs repeat themselves, therefore before the transition points. It is appreciated that because the LSBs are kept the same from the previous servo track to the next consecutive servo track, at transition points, in order to correctly decode the read values, the MSB vector value is used.

According to some embodiments, the track number may be based on the following equation:

Track Number=(MSB decoded value)×(code length)+(MSB decoded value+LSB decoded value) % (code length).

For example, if the read MSB value is 1 and the read LSB value is 7, then it is determined that the associated servo track is 12 because 1 (MSB value)×8 (code length)+[1 (MSB value)+3 (decoded value for read LSB value of 7)]% 8=12. In other examples, if the read MSB value is 3 and the read LSB value is 14, then it is determined that the associated servo track is 24 because 3 (MSB value)×8 (code length)+[3 (MSB value)+5 (decoded value for read LSB value of 14)]% 8=24.

Accordingly, the track number may be determined by decoding the read MSB values and further by decoding the read LSB values. The full detected vectors 710 may be read and input to the processor 720 and/or the decoder 725. It is appreciated that only the first 28 tracks are shown. As such, the track address may be obtained. As such, the transition points are account for when determining the track number and the associated vector.

Figure 8:
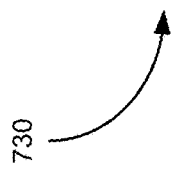
FIG. 8 shows another lookup table according to one aspect of the present embodiments.

Referring now to FIG. 8, a lookup table 730 according to some embodiments is shown. The lookup table 730 may store the association between the encoded value and the track number. The first column may represent the encoded values and the second column shows the corresponding track numbers. For example, the encoded value 3 is decoded to track number 2, the encoded value 14 is decoded to track number 5, the encoded value 8 is decoded to track 7, etc. It is appreciated that the lookup table 730 may include 8 entries, as presented herein, because the RLL Gray LSB in this illustrative embodiment has a code length of 8, which means it repeats itself after 8 servo track. Thus, only 8 encoded values need to be stored. It is appreciated that RLL Gray LSB according to other embodiments, using different number of least significant bits, different run length, etc. may result in a different code length. As such, the description of the code length of 8, is merely illustrative and not intended to limit the scope of the embodiments.

Accordingly, embodiments described above present a new Gray encoding/decoding scheme to more evenly distribute the changing bits in order to be able to use writing schemes such as EBW while satisfying minimum feature size constraints as feature size becomes smaller.

Figure 9:
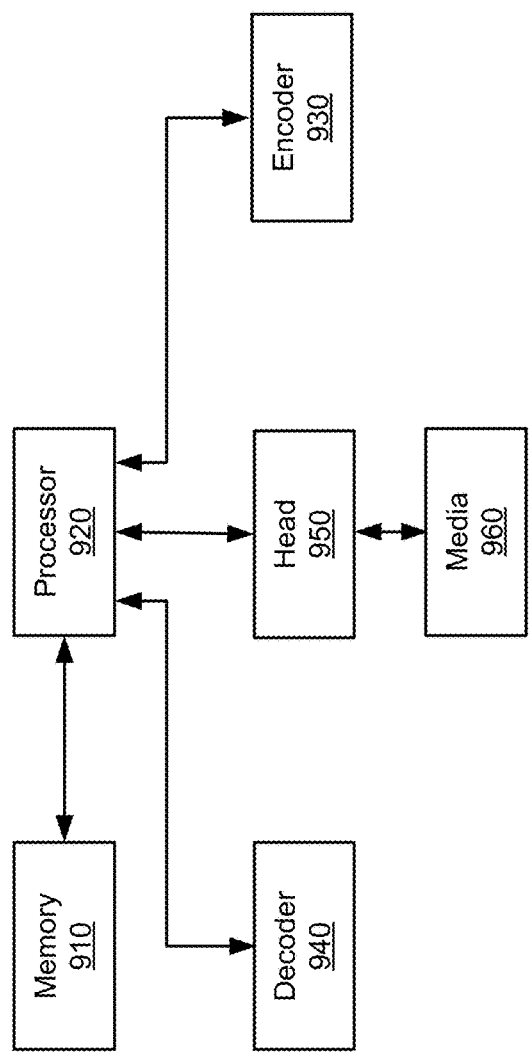
FIG. 9 shows a system diagram according to one aspect of the present embodiments.

Referring now to FIG. 9, a system diagram according to some embodiments is shown. The system includes a memory component 910, a processor 920, an encoder 930, a decoder 940, a head 950, and a media 960. The memory component 910 is configured to store information that when executed by the processor 920 it causes the processor 920 to control the operation of one or more encoder 930, decoder 940, and head 950. For example, the processor 920 in combination with the encoder 930 may cause the head 950 to write servo tracks on media 960 that are Gray encoded according to the schemes described with respect to FIGS. 1-8. Moreover, the processor 920 in combination with the decoder 940 may cause the head 950 to read and decode information from the media 960 that are grey decoded according to the embodiments described in FIGS. 1-8. It is appreciated that even though various components are shown as individual components, they may be combined to form one integrated component. For example, the encoder 930 and the decoder 940 may be formed as an integrated unit to form an encoder/decoder. It is furthermore appreciated that the encoding and decoding according to encoder 930 and decoder 940 may be performed as an integral part of the processor 920. As such, description of the individual components is for illustrative purposes and not intended to the limit the scope of the embodiments.

Figure 10:
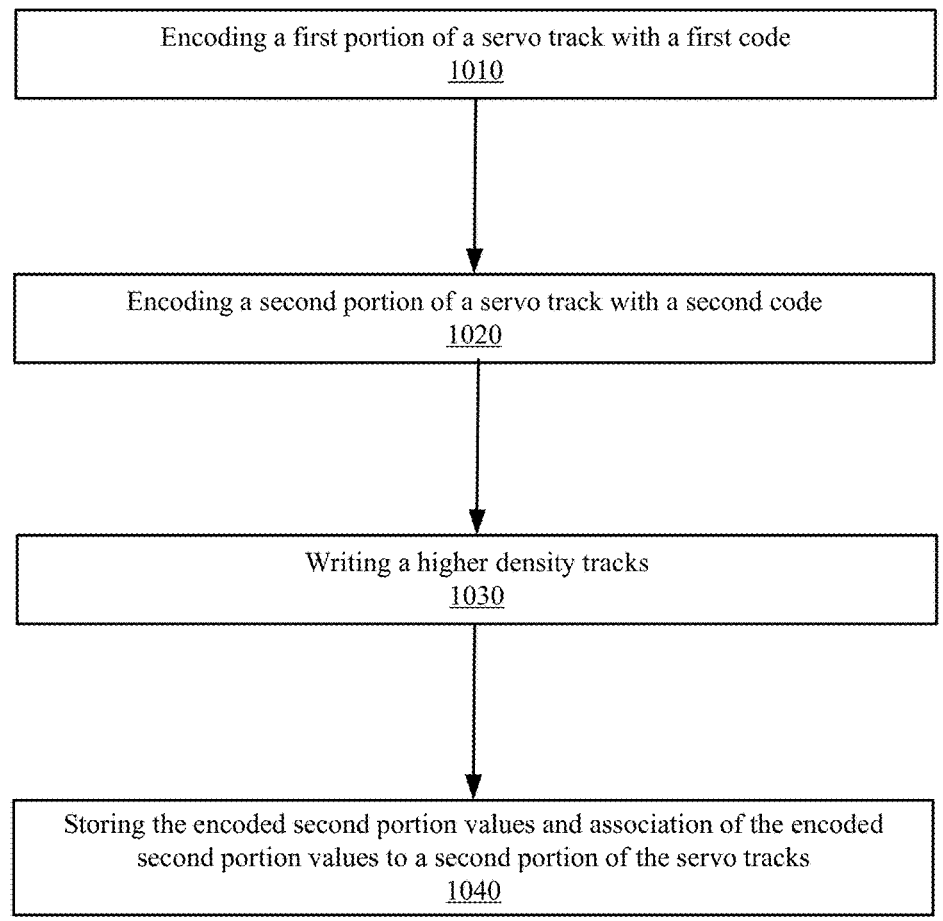
FIG. 10 shows an encoding flow diagram according to one aspect of the present embodiments.

Referring now to FIG. 10, an encoding flow diagram according to some embodiments is shown. At step 1010, a first portion of the servo track is encoded based on a first code. For example, the first portion may be the MSB portion of the servo track and the first code may be the standard Gray code, as discussed above with respect to FIGS. 1A-1C, 3, 6, and 9. At step 1020, a second portion of the servo track is encoded based on a second code. For example, the second portion may be the LSB portion of the servo track and the second code may be another type of Gray encoding, as discussed above with respect to FIGS. 1A-1C, 3, 6, and 9.

At step 1030, the servo tracks are written with higher density tracks based on technology such as EBW according to the encoding scheme of steps 1010 and 1020, as well as according to description presented above in FIGS. 1A-1C, 3, 6, and 9. Using the encoding scheme presented herein enables more even distribution of changing bits in Gray codes, thereby satisfying minimum feature size constraints of EBW as features become smaller. At step 1040, the values of the encoding scheme for the second portion may be stored along with its association with track numbers. For example, the encoded values and its corresponding track number may be stored in a lookup table for fast access rather than having to decode at the time of reading data. It is appreciated that small size lookup tables may be used to store the encoded values and their corresponding track numbers because the encoded values repeat themselves after many servo tracks also referred to as code length, depending on the Gray code used, number of bits, run length, etc., as presented above.

Figure 11A:
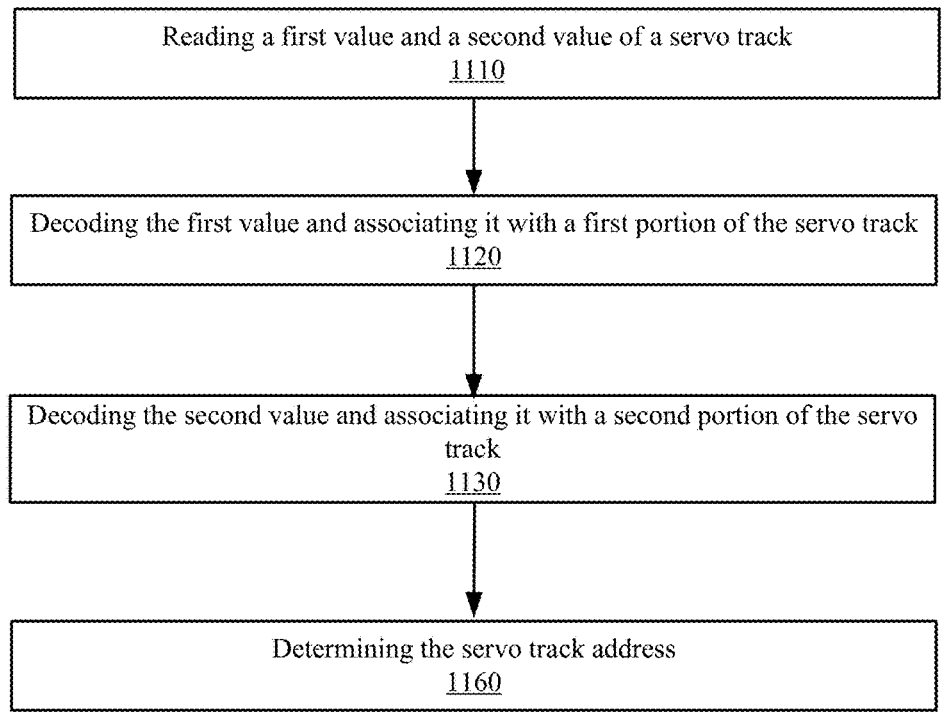
FIGS. 11A-B show a decoding flow diagram according to one aspect of the present embodiments.

Referring now to FIG. 11A, a decoding flow diagram according to some embodiments is shown. At step 1110, a first value and a second value of a servo track may be read by a head component according to FIGS. 2A-2C, 4-5, and 7-9. It is appreciated that the first and the second values may have been encoded values according to the FIGS. 1A-1C, 3, 6, 9, and 10.

At step 1120, the first value is decoded and associated with a first portion of the servo track, as described above with respect to FIGS. 2A-2C, 4-5, and 7-9. At step 1130, the second value is decoded and associated with a second portion of the servo track, as described above with respect to FIGS. 2A-2C, 4-5, and 7-9. At step 1160, the servo track address is determined, as described above with respect to FIGS. 2A-2C, 4-5, and 7-9.

Figure 11B:
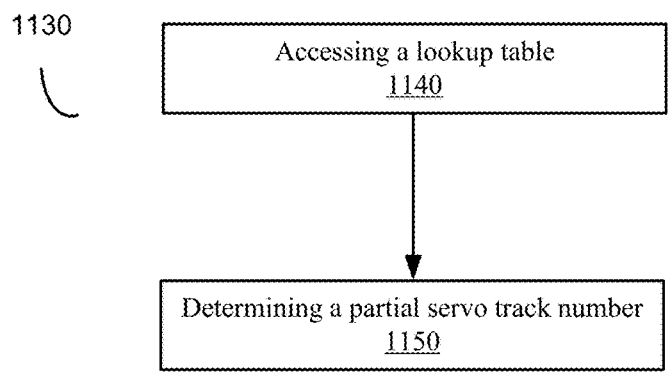

Referring now to FIG. 11B, decoding of the second portion according to some embodiments is shown. At step 1140, a lookup table may be accessed to associate the encoded value with a track number, also referred to as partial servo track number because it repeats itself after many servo tracks based on the code length. At step 1150, the partial servo track number is determined which may be subsequently used to determine the actual servo track number and its address, as described above with respect to FIGS. 2A-2C, 4-5, and 7-9.

Accordingly, embodiments described above present a new Gray encoding/decoding scheme to more evenly distribute the changing bits in order to be able to use writing schemes such as EBW while satisfying minimum feature size constraints as feature size become smaller.

While some particular embodiments have been provided herein, and while these particular embodiments have been provided in considerable detail, it is not the intention for these particular embodiments to limit the scope of the concepts provided herein. Additional adaptations and/or modifications may readily appear, and, in broader aspects, these adaptations and/or modifications may be encompassed as well. Accordingly, departures may be made from the foregoing embodiments without departing from the scope of the concepts provided herein. The implementations described above and other implementations are within the scope of the following claims.

What is claimed is:

1. A method comprising:
encoding a first portion of a servo track with a first code, wherein the first portion comprises a first plurality of bits that corresponds to a most significant bits of the servo track; and
encoding a second portion of the servo track with a second code, wherein the second portion comprises a second plurality of bits that corresponds to a least significant bits of the servo track, and wherein the first portion is exclusive of the second portion, wherein the second code has a run length associated therewith, wherein each bit of the second plurality of bits remains constant for at least a number of tracks corresponding to the run length, and wherein the first and the second code generate a Gray code.

2. The method as described by claim 1, wherein bits of the first plurality of bits remain unchanged for a number of tracks based on the second code and its associated run length.

3. The method as described by claim 2, wherein the encoding the second portion remains a same from one servo track to another servo track when one bit of the first plurality of bits changes values between two consecutive servo tracks.

4. The method as described by claim 1, wherein the encoding of the second portion repeats itself after a certain number of servo tracks based on the second code and its associated code length.

5. The method as described by claim 1, wherein a hamming distance between any two consecutive servo tracks is one.

6. The method as described by claim 1 further comprising:
writing a higher density tracks using e-beam writer based on greater distribution of changing bits by maintaining the each bit of the second plurality of bits constant for the number of tracks corresponding to the run length in comparison to a Gray code that changes a least significant bit of the second plurality of bits at every other servo track.

7. The method as described by claim 1, wherein each bit of the first plurality of bits remains constant for at least a number of tracks corresponding to the run length.

8. The method as described by claim 1, wherein the second code is a Gray code for a number of consecutive tracks that corresponds to two to the power of number of bits in the second plurality of bits.

9. The method as described by claim 1 further comprising:
storing Gray code values associated with the second plurality of bits in a lookup table; and
associating the Gray code values to a plurality of partial servo track numbers.

10. A method comprising:
decoding a first value based on a first code to obtain a decoded first value, wherein the decoded first value is associated with a first plurality of bits that corresponds to a most significant bits of a servo track; and
decoding a second value based on a second code to obtain a decoded second value, wherein the second value is associated with a second plurality of bits that corresponds to a least significant bits of the servo track, wherein the second code is a de-Gray code,
wherein a servo track address is obtained from the decoded first value and the decoded second value,
wherein the second value repeats itself after a certain number of servo tracks based on the second code and its associated run length.

11. The method as described by claim 10, wherein the decoded first value is a value associated with an exclusive OR operation between the first value of two consecutive read servo tracks.

12. The method as described by claim 11, wherein a number associated with the servo track address is based on the decoded first value and the decoded second value.

13. The method as described by claim 10, wherein the decoding the second value comprises:
accessing a lookup table that stores Gray code values associated with a partial servo track number, wherein the lookup table comprises entries associated with the second values based on the second code; and
determining the partial servo track number.

14. A system comprising:
a memory component configured to store information;
a processor configured to process information and further configured to control operation of other components;
an encoder controlled by the processor, wherein the encoder is configured to encode a first portion of a servo track with a first code resulting in a first encoded value and wherein the encoder is configured to encode a second portion of the servo track with a second code resulting in a second encoded value, wherein the second code has a run length associated therewith, wherein the first encoded value and the second encoded value result in a Gray code and wherein each bit of the Gray code remains constant for at least a number of tracks corresponding to the run length;
a head configured to write the first encoded value and the second encoded value on a media, wherein the head is further configured to read the first encoded value and the second encoded value from the media; and
a decoder controlled by the processor, wherein the decoder is configured to decode the first encoded value and further configured to decode the second encoded value, wherein the processor is further configured to determine a servo track address from the decoded first value and the decoded second value.

15. The system as described by claim 14 further comprising:
a lookup table configured to store a plurality of encoded values associated with the second code corresponding to the a plurality of servo tracks and associated with the second portion of the servo track.

16. The system as described by claim 15, wherein the decoder is configured to decode the second encoded value by accessing the lookup table.

17. The system as described by claim 14, wherein bits in the first portion remain unchanged for a number of tracks based on the second code and the run length.

18. The system as described by claim 17, wherein the encoding the second portion remains a same from one servo track to another servo track when one bit of the first portion changes values between two consecutive servo tracks.

19. The system as described by claim 14, wherein the encoding of the second portion repeats itself after a certain number of servo tracks based on the second code and its associated code length.

20. The system as described by claim 14, wherein the decoded first encoded value is a value associated with an exclusive OR operation between the first value of two consecutive read servo tracks.

21. The system as described by claim 14, wherein a number associated with the servo track address is based on the decoded first value and the decoded second value.

\* \* \* \* \*